(12) United States Patent
Cho (10) Patent No.: US 10,897,327 B2
(45) Date of Patent: *Jan. 19, 2021

(54) DISTRIBUTED ANTENNA SYSTEM

(71) Applicant: SOLiD Inc., Seongnam-si (KR)

(72) Inventor: Young Man Cho, Seoul (KR)

(73) Assignee: SOLID INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/234,545

(22) Filed: Dec. 27, 2018

(65) Prior Publication Data

US 2019/0132083 A1   May 2, 2019

Related U.S. Application Data

(63) Continuation of application No. 15/091,912, filed on Apr. 6, 2016, now Pat. No. 10,200,157.

(30) Foreign Application Priority Data

Nov. 4, 2015  (KR) .......................... 10-2015-0154267

(51) Int. Cl.
*H04L 27/00*  (2006.01)
*H04L 1/00*  (2006.01)
(Continued)

(52) U.S. Cl.
CPC .......... *H04L 1/0077* (2013.01); *H04B 7/024* (2013.01); *H04B 17/309* (2015.01); *H04L 27/0004* (2013.01)

(58) Field of Classification Search
None
See application file for complete search history.

(56) References Cited

U.S. PATENT DOCUMENTS 4,822,991 A * 4/1989 Riggs ..................... H03K 17/78
                                                          250/214 R
6,952,181 B2 * 10/2005 Karr ..................... G01C 21/206
                                                           342/457
(Continued)

FOREIGN PATENT DOCUMENTS

EP  0 883 864 B1 B1  9/2002
KR  2002-0063644 A   8/2002
(Continued)

OTHER PUBLICATIONS

Korean Office Action dated Nov. 28, 2016, in counterpart Korean Application No. 10-2015-0154267 (7 pages, in Korean).

(Continued)

*Primary Examiner* — Edan Orgad
*Assistant Examiner* — Emmanuel K Maglo (57) ABSTRACT

A technology related to a distributed antenna system is disclosed. In an exemplary embodiment, a distributed antenna system may include a master unit and a plurality of remote units. The master unit may be interfaced with a wireless communications network and perform a bidirectional simultaneous digital radio frequency distribution of a wireless signal. The plurality of remote units may be each coupled to the master unit, and each perform a wireless transmission or reception of a split radio frequency signal to or from terminals located within a coverage. The master unit and the plurality of remote units may transmit or receive digital radio frequency signals in a wavelet transform domain. The master unit may determine whether the digital radio frequency signal, transmitted by each of the remote units, is normal, and merge the digital radio frequency signals.

13 Claims, 8 Drawing Sheets

(51) Int. Cl.
  *H04B 7/024* (2017.01)
  *H04B 17/309* (2015.01)

(56) References Cited

U.S. PATENT DOCUMENTS

| | | | | |
|---|---|---|---|---|
| 7,302,240 | B2* | 11/2007 | Koga | H04B 3/54 |
| | | | | 375/232 |
| 7,639,982 | B2 | 12/2009 | Wala | |
| 8,064,722 | B1* | 11/2011 | Rose-Pehrsson | G06K 9/6228 |
| | | | | 327/1 |
| 8,918,061 | B2 | 12/2014 | Haghighat et al. | |
| 9,497,706 | B2* | 11/2016 | Atias | H04W 52/0206 |
| 2001/0043079 | A1* | 11/2001 | Sakaguchi | G01R 31/319 |
| | | | | 324/762.02 |
| 2002/0103012 | A1 | 8/2002 | Kim | |
| 2003/0096578 | A1 | 5/2003 | McCorkle et al. | |
| 2003/0179942 | A1* | 9/2003 | Okada | H04N 5/232 |
| | | | | 382/240 |
| 2004/0057529 | A1 | 3/2004 | Koga | |
| 2005/0068911 | A1* | 3/2005 | Miyake | H04L 47/10 |
| | | | | 370/299 |
| 2005/0171736 | A1* | 8/2005 | Kang | G01H 1/006 |
| | | | | 702/185 |
| 2005/0172152 | A1* | 8/2005 | Orr | G06T 1/0021 |
| | | | | 726/5 |
| 2005/0190085 | A1 | 9/2005 | Kadono et al. | |
| 2009/0290632 | A1* | 11/2009 | Wegener | H03M 7/30 |
| | | | | 375/240 |
| 2010/0220607 | A1* | 9/2010 | Fujishima | H04W 16/10 |
| | | | | 370/252 |
| 2010/0261977 | A1* | 10/2010 | Seely | G16H 10/60 |
| | | | | 600/300 |
| 2011/0134853 | A1* | 6/2011 | Zhu | H04B 1/7143 |
| | | | | 370/329 |
| 2011/0135013 | A1* | 6/2011 | Wegener | H03M 7/40 |
| | | | | 375/241 |
| 2011/0159888 | A1* | 6/2011 | Braiman | G01S 5/0252 |
| | | | | 455/456.1 |
| 2012/0057572 | A1* | 3/2012 | Evans | H04W 88/085 |
| | | | | 370/338 |
| 2012/0176966 | A1* | 7/2012 | Ling | H04B 1/40 |
| | | | | 370/328 |
| 2012/0203166 | A1* | 8/2012 | Riback | A61B 5/14532 |
| | | | | 604/66 |
| 2012/0250740 | A1* | 10/2012 | Ling | H04W 88/085 |
| | | | | 375/219 |
| 2013/0177317 | A1* | 7/2013 | Rospsha | H04B 10/25754 |
| | | | | 398/93 |
| 2013/0251079 | A1* | 9/2013 | Miyahara | H04B 1/10 |
| | | | | 375/346 |
| 2013/0260705 | A1* | 10/2013 | Stratford | H04B 17/12 |
| | | | | 455/226.1 |
| 2013/0337750 | A1* | 12/2013 | Ko | H04W 24/00 |
| | | | | 455/67.13 |
| 2014/0024402 | A1* | 1/2014 | Singh | H04B 17/12 |
| | | | | 455/501 |
| 2014/0064730 | A1* | 3/2014 | Ko | H04B 10/2575 |
| | | | | 398/67 |
| 2014/0146906 | A1 | 5/2014 | Zavadsky et al. | |
| 2014/0152811 | A1* | 6/2014 | Kwon | H04B 17/309 |
| | | | | 348/135 |
| 2014/0175261 | A1* | 6/2014 | Addison | A61B 5/7221 |
| | | | | 250/206 |
| 2014/0233442 | A1* | 8/2014 | Atias | H04W 52/0206 |
| | | | | 370/311 |
| 2014/0286643 | A1* | 9/2014 | George | H04B 10/25759 |
| | | | | 398/115 |
| 2014/0313947 | A1* | 10/2014 | Ali-Ahmad | H04L 5/18 |
| | | | | 370/278 |
| 2014/0362763 | A1* | 12/2014 | Hu | H04W 88/085 |
| | | | | 370/315 |
| 2015/0098351 | A1* | 4/2015 | Zavadsky | H04W 24/06 |
| | | | | 370/252 |
| 2015/0156284 | A1* | 6/2015 | Akhter | H04L 69/04 |
| | | | | 370/477 |
| 2015/0229386 | A1* | 8/2015 | Lange | H04B 7/15507 |
| | | | | 370/317 |
| 2015/0317284 | A1* | 11/2015 | Takahashi | G06F 17/18 |
| | | | | 702/181 |
| 2016/0066331 | A1* | 3/2016 | Harel | H04W 72/0473 |
| | | | | 370/252 |

FOREIGN PATENT DOCUMENTS

| | | |
|---|---|---|
| KR | 10-2009-0122311 A | 11/2009 |
| KR | 10-2009-0130377 A | 12/2009 |
| KR | 10-1007381 B1 | 1/2011 |

OTHER PUBLICATIONS

Korean Office Action dated Mar. 20, 2017 in counterpart Korean Application No. 10-2015-0154267 (2 pages in Korean).
Extended European Search Report dated Mar. 30, 2017, in counterpart European Application No. 16163781.4 (6 pages in English).
Non-final office action dated Dec. 1, 2017 for U.S. Appl. No. 15/091,912.
Final office action dated Jun. 25, 2018 for U.S. Appl. No. 15/091,912.
Notice of Allowance dated Sep. 28, 2018 for U.S. Appl. No. 15/091,912.

* cited by examiner

DISTRIBUTED ANTENNA SYSTEM

CROSS-REFERENCE TO RELATED APPLICATION(S)

This application is a continuation of U.S. application Ser. No. 15/091,912, filed Apr. 6, 2016 (now pending), which claims the benefit under 35 U.S.C. § 119(a) of Korean Patent Application No. 10-2015-0154267, filed on Nov. 4, 2015, in the Korean Intellectual Property Office, the entire disclosure of which is incorporated herein by reference for all purposes.

BACKGROUND

1. Field

The following description relates to a wireless communications technology, and more specifically, to a technology related to a distributed antenna system.

2. Description of the Related Art

U.S. Pat. No. 7,639,982 discloses a typical distributed antenna system including a digital host unit and digital remote units. Such a distributed antenna system improves reliability and coverage with reduced total power by splitting a radio frequency signal into a plurality of remote units that are spatially separate from each other. An uplink signal, which is transmitted from the plurality of digital remote units to an uplink, is added in a time domain at a digital host unit, which is then transmitted to a mobile telecommunications switching office (MTSO).

Since the radio frequency signal is transmitted through an optical fiber network, etc. in a time domain, there may be poor transmission efficiency because of data redundancy, and it may be difficult to analyze characteristics of individual digital radio frequency signals at digital remote units.

SUMMARY

The purpose of a proposed invention is to improve transmission efficiency between node units that composes a distributed antenna system.

Moreover, the proposed invention is to improve stability in operations of a distributed antenna system.

Furthermore, the proposed invention is to facilitate determining whether a terminal signal is normal through an economical transform with a small amount of calculations, without excessively increasing latency.

In one general aspect, a distributed antenna system includes a master unit and a plurality of remote units. The master unit is interfaced with a wireless communications network and performs a bidirectional simultaneous digital radio frequency distribution of a wireless signal. The plurality of remote units is each coupled to the master unit, and each performs a wireless transmission or reception of a split radio frequency signal to or from terminals located within a coverage.

The master unit and the plurality of remote units transmit or receive digital radio frequency signals in a wavelet transform domain.

The master unit may determine whether the digital radio frequency signal, transmitted by each of the remote units, is normal, and merge the digital radio frequency signals.

The master unit may determine whether a corresponding split radio frequency signal is normal based on the digital radio frequency signals transformed to a wavelet domain.

The master unit may determine whether the digital radio frequency signal, transmitted by each of the remote units, is normal, and calculate and merge a weighted sum of each radio frequency signal, of which a weight changes according to whether the digital radio frequency signal is normal.

The master unit may determine whether each digital radio frequency signal, transmitted by each of the remote units, is normal, and merge normal and abnormal digital radio frequency signals into respective groups.

The master unit and the plurality of remote units may compress the digital radio frequency signal, on which a wavelet-transform has been performed, and transmit or receive the compressed digital radio frequency signal.

The distributed antenna system may be coupled to the master unit on one side thereof and to another plurality of remote units on the other side thereof, and further comprise a hub unit to relay digital radio frequency signals in a wavelet transform domain, which are transmitted and received between the plurality of remote units and the master unit.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
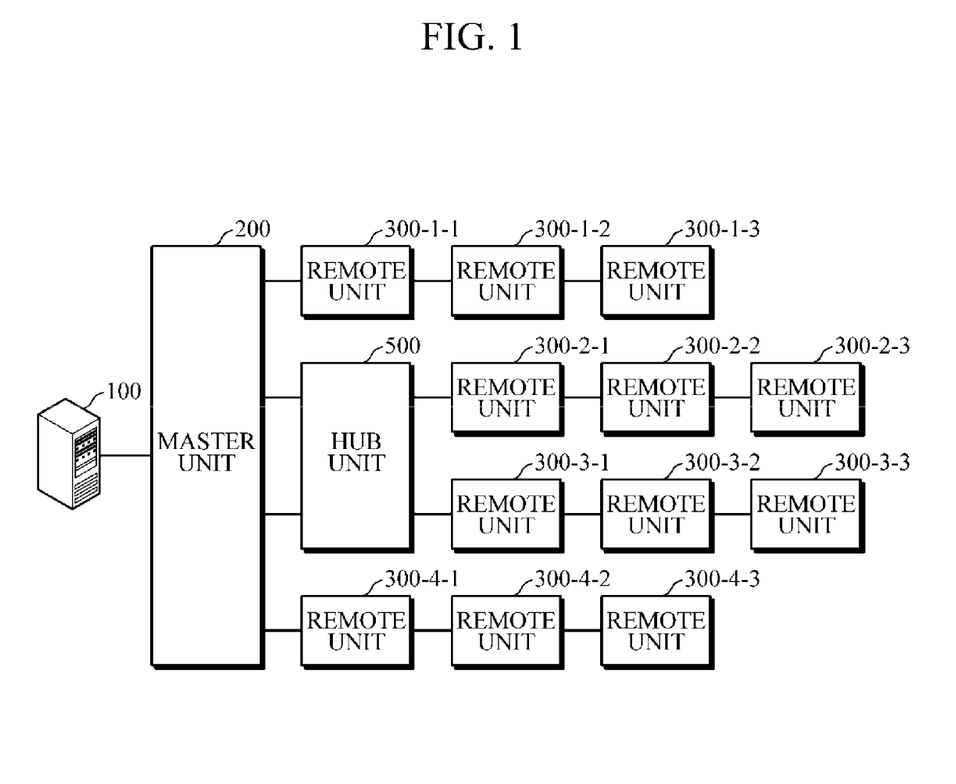
FIG. 1 is a diagram illustrating a distributed antenna system according to an exemplary embodiment.

FIG. 1 is a diagram illustrating a distributed antenna system according to an exemplary embodiment. As illustrated in FIG. 1, the distributed antenna system according to an exemplary embodiment includes a master unit 200 and a plurality of remote units 300.

The master unit 200 is interfaced with a wireless communications network 100 and performs a bidirectional simultaneous digital radio frequency distribution of a wireless signal. The wireless communications network 100 is a communications node that is to provide the wireless communications through the distributed antenna system, and for example, may be the mobile communications base station. In another example, the wireless communications network 100 may be Ethernet nodes that are connected to a network backbone.

FIG. 1 illustrates one wireless communications network 100 that is connected to the master unit 200, but exemplary embodiments thereof are not limited thereto. For example, a plurality of wireless communications networks having different standards or frequency bands may be connected to the master unit 200. Even though the RF band signal of each wireless communications network is added, the added RF band signal may be efficiently separated and extracted by devices, which are located within each wireless communications, due to the characteristics of the wireless communications itself. An RF adder may be added between the master unit 200 and the plurality of wireless communications networks nodes so as to support the plurality of wireless communications networks.

The master unit 200 transforms, to a digital radio frequency signal, an analog radio frequency signal of the RF band that is received from the wireless communications network 100; and then splits the digital radio frequency signal into a plurality of output ports. FIG. 1 illustrates the master unit 200, which has, for example, three output ports. In the present disclosure, the 'radio frequency signal' indicates an electrical signal inside the distributed antenna system, or may indicate a digital or analog signal, an RF band signal, an intermediate frequency (IF) band signal, and even a baseband signal. The 'radio frequency signal' is called such a name due to the fact that the distributed antenna system uses a radio frequency signal, such as a mobile communications, Wi-Fi signal, etc., and that even though such a signal goes through band conversion by a mixer for the convenience of transmission or processing inside the system thereof, its substance is still such a radio frequency signal. Accordingly, among these radio frequency signals, the 'digital radio frequency signal' refers to a signal that is transformed to digital.

Remote units 300 may be connected to such output ports. Each of the plurality of remote units 300 is coupled to the master unit 200, and each performs the wireless transmission or reception of the split radio frequency signal to or from terminals, which are located within the coverage. In a case the master unit 200 has the sufficient output ports corresponding to the scale of a system, the remote units 300 may be configured to form a star network around the master unit 200. The signal for the interface between the master unit 200 and the mobile communications network 100 may be transmitted through coaxial cables, optical fibers, or the like. For such configuration, general communications components may be added to the master unit 200. Also, one of the various communications lines, which are appropriate for the capacity, e.g., coaxial cables, Ethernet cables, optical fibers, between the master unit and the remote unit; the remote unit; the master unit and a hub; and the hub and remote unit, may be applied.

The 'analog radio frequency signal' or 'radio frequency signal' that has no additional limit, as described in the present disclosure, indicates a signal of an RF band, which may be transmitted or received through an antenna. A 'digital radio frequency signal' indicates a signal, which is acquired after the analog radio frequency signal is band-shifted to a low frequency band and converted to the digital signal. A digital radio frequency signal in a downlink channel may be a signal, which is acquired after the analog radio frequency signal, received from the wireless communications network 100, is band-shifted to a low frequency band and converted to the digital. A digital radio frequency signal in an uplink channel may be a signal, which is acquired after the radio frequency signal, received from terminals within the corresponding coverage at each remote unit, is band-shifted to a low frequency band and converted to the digital.

Also, a 'split digital radio frequency signal' indicates a signal, which is acquired after the signal that has been split from a radio frequency signal of an RF band is band-shifted to a low frequency band and converted to the digital. Such a split digital radio frequency signal may be generated from a radio frequency signal of an RF band through a signal process of, at a master unit, being band-shifted to a low frequency band and converted to the digital, and at a remote unit, being fan-out through a fan-out buffer.

In one exemplary embodiment, the master unit 200 and a plurality of remote units 300 transmit or receive a digital radio frequency signal to or from a wavelet transform domain. The digital radio frequency signal in the wavelet transform domain may have the signal characteristics that are different from those in the time or frequency domain. For example, in the wavelet transform domain, the digital radio frequency signal may be more advantageous to compression. In another example, in the wavelet transform domain, the digital radio frequency signal may have an advantage of reliability or computation in determining its normality.

In another exemplary embodiment, the master unit 200 may determine whether the digital radio frequency signals transmitted by each of the remote units 300 is normal, and accordingly, may merge the corresponding digital radio frequency signals. By the incoming abnormal radio frequency signals, which are generated by a mobile terminal performing an abnormal operation, the communications faults may occur in a lot of mobile terminals located within the coverage of the corresponding base station, but may not occur depending on a communications method.

In another exemplary embodiment, the master unit 200 may determine whether the corresponding split radio frequency signal is normal, based on the digital radio frequency signal that is transformed to the wavelet domain. Whether the split radio frequency signal of the corresponding remote unit is normal may be determined through the distribution pattern or characteristics of the wavelet coefficients of the digital radio frequency signal.

In still another exemplary embodiment, the master unit 200 may determine whether the digital radio frequency signal, transmitted by each of the remote units 300, is normal, and calculate and merge the weighted sum of the respective digital radio frequency signals, of which the weight may depend on whether the digital radio frequency signal is normal. If it is assumed that the signal of the weighted sum, generated by the master unit 200, is y; each digital radio frequency signal is $x_i$; the weight corresponding to $x_i$ is $a_i$; and the number of the connected remote units 300 is N, the signal of the weighted sum may be represented by Equation 1 as shown below.

$$y = \sum_{1}^{N} a_i \cdot x_i \quad (1)$$

Here, the weight $a_i$ may be determined depending on whether the corresponding digital radio frequency signal $x_i$ is normal. For example, the master unit 200 may lower the weight of the abnormal signals, which leads to the reduction of its importance in the signal of the weighted sum, and transmit the lowered weight to an upper node. In another example, in a case in which the abnormality degree of the abnormal signals is higher than a certain value, the master unit 200 may not transmit said signal component to the upper node by setting the weight as 0.

The master unit 200 and the plurality of the remote units 300 may compress the digital radio frequency signal, on which a wavelet transform has been performed, and transmit or receive the compressed digital radio frequency signal. For example, the master units and the remote units 300 may transmit only the wavelet coefficients of which size are higher than a certain value, thereby performing a linear compression in a wavelet transform domain.

A distributed antenna system may be coupled to the master unit 200 on one side thereof and to another plurality of remote units on the other side thereof, and further include a hub unit 500 that relays digital radio frequency signals in a wavelet transform domain, which are transmitted and received between the remote units and the master unit. When the master unit 200 needs to be connected to the remote units 300, of which the number is greater than that of the ports the master unit 200 has, the distributed antenna system may be provided with a hub unit 500, to which the remote units 300 may be connected. The hub unit 500 may be connected to the master unit 200 directly or to the cascaded remote units. Since the configuration of such a hub unit 500 is well-known, the detailed description thereof is omitted here.

Figure 2:
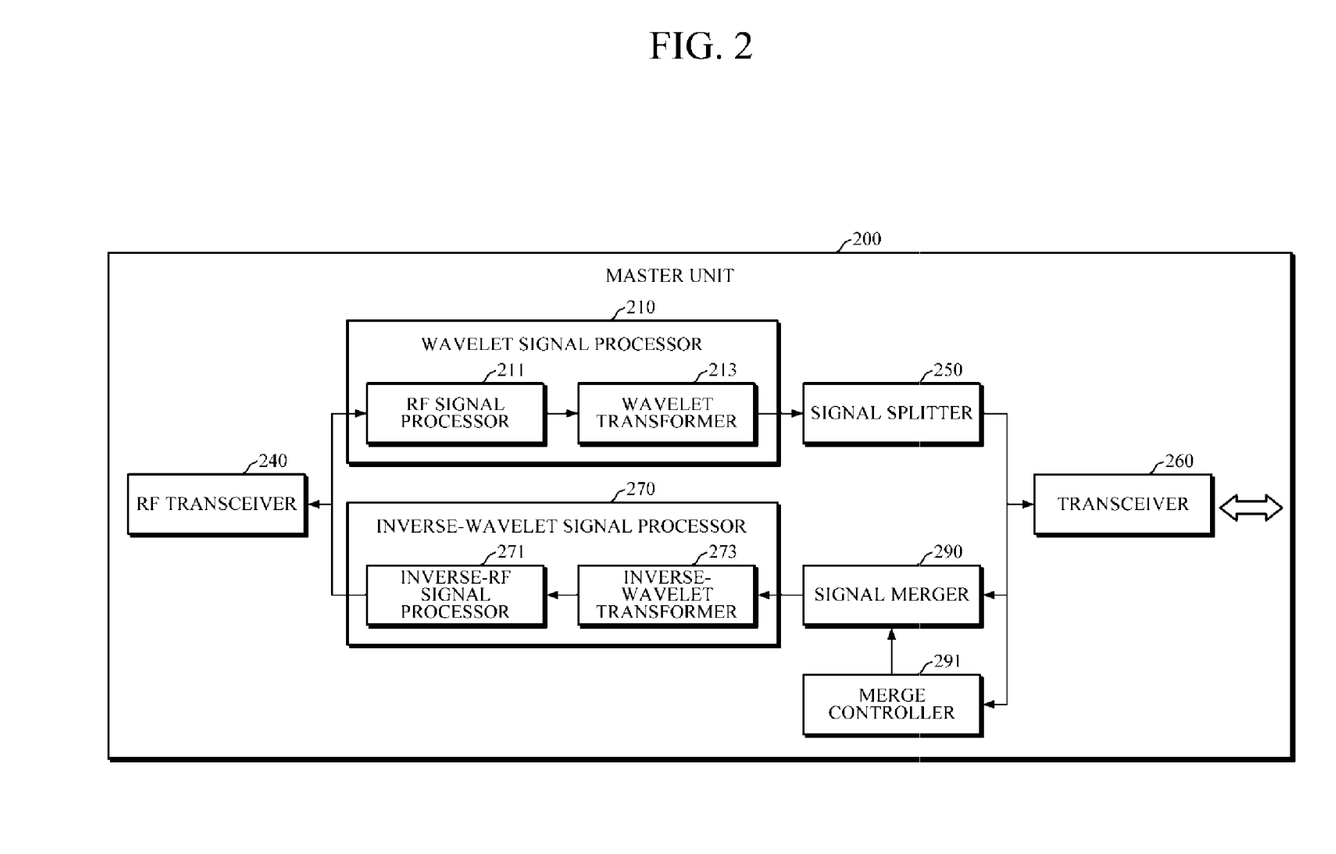
FIG. 2 is a diagram illustrating the configuration of a master unit according to an exemplary embodiment.

FIG. 2 is a diagram illustrating the configuration of a master unit according to an exemplary embodiment. As illustrated in FIG. 2, a master unit 200 according to an exemplary embodiment includes a wavelet signal processor 210, a signal splitter 250, a signal combiner 290, and an inverse wavelet signal processor 270. Each of FIG. 2 and the following diagrams is shown as a logical functional unit. Each diagram may be shown as one individual component or as a module in which a plurality of components are assembled. Alternatively, neighboring or separated two blocks may be physically configured as one component; or a part of said neighboring or separated two blocks may do. In addition, some of the described functions may be implemented according to a microprocessor and program commands. It may be understood that such an implementation may be variously selected by those skilled in the art.

First, a downlink path will be specifically described. In one exemplary embodiment, a downlink path of the master unit 200 includes an RF transceiver 240, a wavelet processor 210, a signal splitter 250, and a transceiver 260. The wavelet processor 210 transforms, to a wavelet domain, a radio frequency signal coming from a mobile communications network. In one exemplary embodiment, the wavelet processor 210 includes an RF processor 211 and a wavelet transformer 213. The RF signal processor 211 may include a low-noise amplifier; a mixer that band-shifts a signal to an intermediate frequency (IF) band; and an analog-to-digital converter that converts such an analog IF signal to a digital signal. The wavelet transformer 213 performs a wavelet transform on the radio frequency signal that has been transformed in the digital, which is then transformed to a serial packet frame appropriate for the serial transmission according to a selected transmission standard.

In one exemplary embodiment, the signal splitter 250 splits, into a plurality of digital radio frequency signals, the digital radio frequency signal transformed to a wavelet domain as described above, which is then output. The signal splitter 250 may be, for example, a fan-out buffer. According to the input terminal properties and the number of the ports of the transceiver 260 that is connected to the signal splitter 250, the fan-out buffer may buffer the appropriate output properties.

As illustrated in FIG. 2, the master unit 200 includes an RF transceiver 240 additionally. The RF transceiver 240 is a base station interface unit (BIU), which is an interface between a base station transceiver system (BTS) and the master unit 200. Such a BIU, i.e., the RF transceiver 240, may be equipped separately for each mobile communications service provider and for each frequency band. A plurality of radio frequency signals, connected to the master unit 200, may be processed as merged or separated individually at the RF transceiver 240. The RF transceiver 240 transforms a high-power signal, coming from the mobile communications network the same as a base station, into the power that is appropriate for the process at the master unit 200.

The transceiver 260 having the ports, connected to the plurality of remote units, may include a plurality of wavelength division multiplexing (WDM) transceiver. In a case where a radio frequency signal is transmitted through a passive optical network (PON) using a WDM method, the radio frequency signal may be transmitted or received not only through one optical fiber line, but also may be transmitted in such a way that makes the carrier frequency changed and the plurality of radio frequency signals split. For example, while the plurality of radio frequency signals of the service providers, coming from the mobile communications network, are each processed at the plurality of wavelet processors 210, which then pass through the signal splitter 250, and are electrically-optically transformed, the plurality of radio frequency signals may be modulated into the carrier frequencies different from each other, which is then transmitted through the same optical fiber line. In another exemplary embodiment, a radio frequency signal for a voice communications service, and a WI-FI radio frequency signal for a wireless internet service are each processed at the plurality of wavelet processors 210, which then pass through the signal splitter 250, and are modulated at each port of the transceiver 260 into the carrier frequencies different from each other, which is then transmitted through the same optical fiber line.

Hereinafter, an uplink path will be specifically described. In one exemplary embodiment, an uplink path of a master unit 200 includes the transceiver 260, a signal merger 290, an inverse-wavelet signal processor 270, and the RF transceiver 240.

The signal merger 290 merges digital radio frequency signals in a wavelet domain, which is received from a plurality of remote units. The packet streams of the digital radio frequency signals are separated from a frame and synchronized, so that wavelet coefficients corresponding to the same wavelet basis may be added to and combined with each other. The signal merger 290 extracts a payload from a serial packet frame of the plurality of ports of the transceiver 260 according to a selected transmission standard. Then, the signal merger 290 transforms such a payload to parallel data and stores the transformed payload in the buffer of each port. Then, the signal merger 290 synchronizes the buffered digital radio frequency signals of each port, to which the corresponding wavelet coefficients are added and merged together, thereby outputting the resultant signal. That is, the digital radio frequency signal from each remote unit is added in a wavelet transform domain.

The signals, added in a radio frequency domain, may be separated into each signal of the mobile terminals from a base station according to the corresponding communications method. In addition, since a wavelet transform is a linear transform, each of the radio frequency signals, on which a wavelet transform has been performed, is processed transparently with regard to the merging in the signal merger 290.

The inverse-wavelet signal processor 270 performs an inverse-wavelet transform on the merged digital radio frequency signal, which is then transformed to the radio frequency signal and output to a mobile communications network. As illustrated in FIG. 2, the inverse-wavelet signal processor 270 includes an inverse-wavelet transformer 273 and an inverse-RF signal processor 271. The terms, such as inverse-wavelet signal processor 270, the inverse-wavelet transformer 273, and the inverse-RF signal processor 271, should not be understood as having the path configuration that is necessarily inverse to the wavelet signal processor 210, the wavelet transformer 213, and the RF signal processor 211. The inverse-wavelet transformer 273 performs an inverse-wavelet transform on the digital radio frequency signal that has been merged at the signal merger 290. The inverse-RF signal processor 271 corresponding to the RF signal processor 211 in the downlink path may include: a digital to analog converter to convert the digital radio frequency signal, on which the inverse-wavelet transform has been performed, to an analog signal; a mixer to band-shift the radio frequency signal, which has been converted to the analog signal, into the original high-frequency band; and a power amplifier. Intermediate frequencies coming from the same generator are input to the mixers of the RF signal processor 211 and the inverse-RF signal processor 271. The RF transceiver 240 amplifies and output the additional power that is enough to be interfaced with the mobile communications network.

The master unit may further include a merge controller 291 that determines whether the digital radio frequency signal, which each remote unit has transmitted, is normal and accordingly controls the merging in the signal merger 290.

The merge controller 291 may determine whether the split radio frequency signal of the corresponding remote unit is normal, based on the digital radio frequency signal that has been transformed to a wavelet domain. By analyzing characteristics, such as a size and a distribution of each wavelet coefficient, the merge controller 291 may determine whether the split radio frequency signal of the corresponding remote unit is normal. In such a case, the remote units do not transmit state information. Only what the master unit does is to determine whether the remote unit is normal, based on the digital radio frequency signal that has been transmitted by the remote unit and transformed in a wavelet domain.

The following characteristics are defined: the characteristics of the coefficients of normal radio frequency signals; a function of calculating feature values from the coefficients of the radio frequency signal (a calculation function); and the feature values of normal radio frequency signals or the range thereof. The range of the feature values of the normal radio frequency signals may be empirically defined. The feature value of the received digital radio frequency signal that has been transformed into a wavelet domain is calculated through the calculation function, and is compared with the stored feature values of the normal range so that whether the digital radio frequency signal is normal may be determined. In another example, the following characteristics are defined: the characteristics of the coefficients of abnormal radio frequency signals; a function of calculating feature values from the coefficients of the radio frequency signal (a calculation function); and the feature values of abnormal radio frequency signals or the range thereof. The range of the feature values of the normal radio frequency signals may be empirically defined. The feature value of the received digital radio frequency signal that has been transformed into a wavelet domain is calculated through the calculation function, and is compared with the stored feature values so that whether the digital radio frequency signal is normal may be determined.

The master unit may determine whether the corresponding digital radio frequency signal is normal by analyzing the existence of, for example, the digital radio frequency signal's signal power, signal to noise ratio (SNR), voltage standing wave ratio (VSWR), adjacent channel leakage ratio (ACLR), spectral emission mask (SEM), passive intermodulation (PIM), spurious signal, etc. The signal power, SNR, VSWR, ACLR, etc. may be the calculation function.

The merge controller 291 determines whether the digital radio frequency signal, transmitted by each remote unit, is normal, calculates and merges a weighted sum of each of the digital radio frequency signals, and determines each weight according to whether the corresponding split radio frequency signal is normal. Whether the corresponding split radio frequency signal is normal depends on an analysis result of the digital radio frequency signal in a wavelet transform domain. The weighted sum may be, for example, calculated, as represented by Equation 1. In response to the determination that the digital radio frequency signal is abnormal, the weight is set as '0', and in response of the determination that the digital radio frequency signal is normal, the weight is set as '1'. In addition, in response to the determination that the digital radio frequency signal is normal, which is, however, a weak signal, amplification coefficients may be set to reach a standard strength on average, and in the case of a strong signal, attenuation coefficients may be set to reach the standard strength on average.

The merge controller 291 merges and calculates the weighted sum of each of the digital radio frequency signals, and determines each weight according to whether the corresponding split radio frequency signal is normal. The merge controller 291 may determine whether the digital radio frequency signal, transmitted by each remote unit, is normal, based on state information that each remote unit has transmitted. The weighted sum may be calculated, for example, as Equation 1. If it has been determined, based on the received state information, that the digital radio frequency signal is not normal, the weight is set as '0', and in response of the determination that the digital radio frequency signal is normal, the weight is set as '1'.

The state information may be generated by analyzing the existence of, for example, the radio frequency signal's signal power, signal to noise ratio (SNR), voltage standing wave ratio (VSWR), adjacent channel leakage ratio (ACLR), spectral emission mask (SEM), passive intermodulation (PIM), spurious signal, etc. Also, the state information may be the radio frequency signal's characteristics information itself, e.g., a power, frequency distribution characteristics, band characteristics, etc. In such a case, the master unit may determine the corresponding remote unit's radio frequency signal is abnormal not by using the state information itself but by additionally processing the received state information.

In addition, in response to the determination that the radio frequency signal is normal, which is, however, a weak signal, amplification coefficients may be set to reach a standard strength on average, and in the case of a strong signal, attenuation coefficients may be set to reach the standard strength on average.

The RF signal processor 211 and the inverse-RF signal processor 271 may be implemented as one RF component. The wavelet transformer 213 and the inverse-wavelet transformer 273 may be implemented by a microprocessor, a digital signal processor, or a series of program modules that are accordingly executed. Many functions of the signal splitter 250, the signal merger 290, and the merge controller 291 may be implemented by the microprocessor, digital signal processor, or the series of the program modules that are accordingly executed, which are the same as described above.

Figure 3:
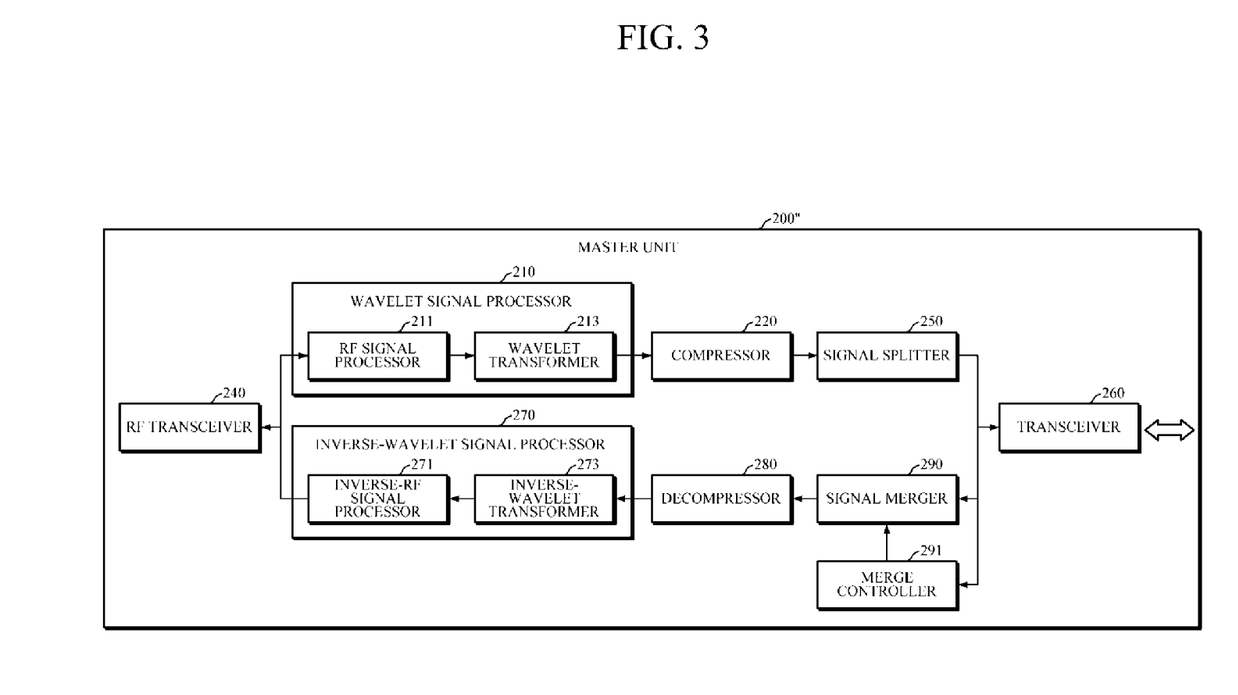
FIG. 3 is a diagram illustrating the configuration of a master unit according to another exemplary embodiment.

FIG. 3 is a diagram illustrating the configuration of a master unit according to another exemplary embodiment. As illustrated in FIG. 3, a master unit according to another exemplary embodiment further includes a compressor 220 and a decompressor 280, compared to the exemplary embodiment in FIG. 2, which is the difference therebetween. The compressor 220 compresses the digital radio frequency signal, which has been transformed to a wavelet domain, between a wavelet signal processor 210 and a signal splitter 250. The decompressor 280 decompresses the digital radio frequency signal in a wavelet domain, which has been merged, between a signal merger 290 and an inverse-wavelet signal processor 270. Since the signals compressed at each of the remote units are merged at the signal merger 290 of a master unit, which is then decompressed at the decompressor 280, the compression algorithm is required to be linear so as to recover the radio frequency signal that has been received from each remote unit. The compression algorithm may be, for example, an algorithm that sets coefficients as '0', which are smaller than a certain size among wavelet coefficients. Reducing the number of transmitted coefficients may make the data compressed.

Figure 4:
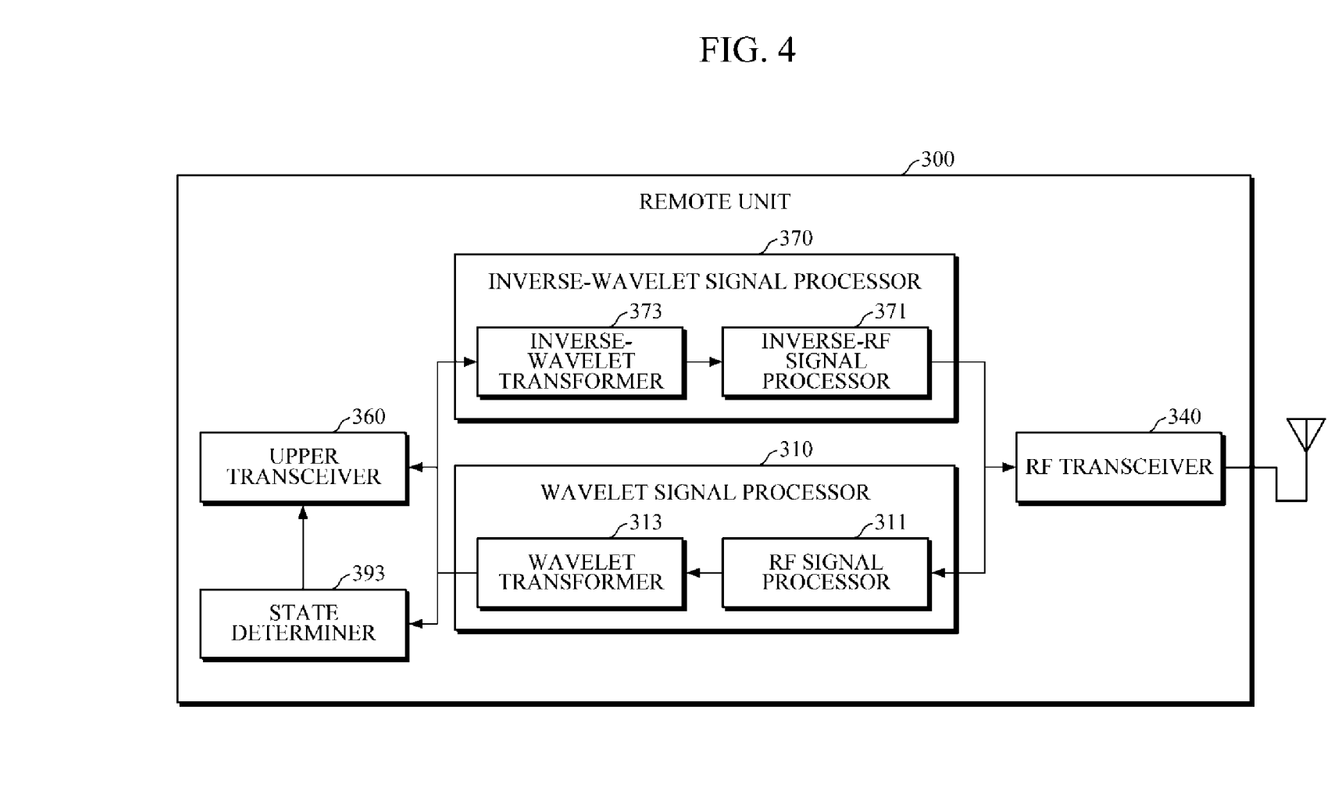
FIG. 4 is a diagram illustrating the configuration of a remote unit according to an exemplary embodiment.

FIG. 4 is a diagram illustrating the configuration of a remote unit according to an exemplary embodiment. As illustrated in FIG. 4, a remote unit 300 according to an exemplary embodiment includes an upper transceiver 360, an inverse-wavelet signal processor 370, and a wavelet signal processor 310. The remote units according to the exemplary embodiment illustrated in FIG. 4 may be connected to a plurality of ports of a master unit in the form of a star-shaped network.

First, a downlink path will be specifically described. A downlink path of the remote unit includes the upper transceiver 360, the inverse-wavelet signal processor 370, and an RF transceiver 340. The upper transceiver 360 transmits or receives, to or from an upper node, a digital radio frequency signal in a wavelet domain. The upper transceiver 360 is a wavelength division multiplexing (WDM) transceiver. In a case where the digital radio frequency signal is transmitted through a passive optical network (PON) using a WDM method, the digital radio frequency signal may be transmitted or received not only through one optical fiber line, but also may be transmitted in such a way that makes the carrier frequency changed and the plurality of radio frequency signals split.

The inverse-wavelet signal processor 370 performs an inverse-wavelet transform on the digital radio frequency signal in a wavelet domain, output from the transceiver, which is then transformed to the split radio frequency signal and output to an antenna. As illustrated in FIG. 4, the inverse-wavelet signal processor 370 includes an inverse-wavelet transformer 373 and an inverse-RF signal processor 371. The terms, such as inverse-wavelet signal processor 370, the inverse-wavelet transformer 373, and the inverse-RF signal processor 371, should not be understood as having the path configuration that is necessarily inverse to the wavelet signal processor 310, the wavelet transformer 313, and the RF signal processor 311. The inverse-wavelet transformer 373 performs an inverse-wavelet transform on the digital radio frequency signal that has been merged at the signal merger 290 of the master unit. The inverse-RF signal processor 371 corresponding to the RF signal processor 211 in the downlink path may include: a digital to analog converter to convert the digital radio frequency signal, on which the inverse-wavelet transform has been performed, to an analog signal; a mixer to band-shift the radio frequency signal, which has been converted to the analog signal, into the original high-frequency band; and a power amplifier. The RF transceiver 340 amplifies and output the additional power that is enough to be communicated with a mobile terminal. It is clear that the power amplifier of the inverse-RF signal processor 371 may be combined with the power amplifier of the RF transceiver 340.

Next, an uplink path will be specifically described. The uplink path of the remote unit includes the RF transceiver 340, the wavelet signal processor 310, and the upper transceiver 360. The wavelet signal processor 310 transforms a radio frequency signal, which has been received from an antenna and then input through the RF transceiver 340, to a wavelet domain, which is then output to the upper transceiver 360. The wavelet signal processor 310 includes an RF signal processor 311 and a wavelet transformer 313. The RF signal processor 311 includes: a low-noise amplifier; a mixer that band-shifts a signal to an intermediate frequency (IF) band; and an analog-to-digital converter that converts such an analog IF signal to a digital signal. The wavelet transformer 313 performs a wavelet transform on the radio frequency signal that has been converted to the digital, which is then transformed to a serial packet frame appropriate for the serial transmission according to a selected transmission standard. Intermediate frequencies coming from the same generator are input to the mixers of the RF signal processor 311 and the inverse-RF signal processor 371.

The remote unit may further include a state determiner 393 that determines whether the radio frequency signal, received from the antenna, is normal. However, exemplary embodiments are not limited thereto; and the remote unit may not include a state determiner, but may transmit, to an upper layer, the wavelet coefficient that has been transformed in a wavelet domain, and let a device on the upper layer, such as the master unit, determine the state. Such a difference in a system configuration may be selected according to the determination of a design variable in accordance with a cost of the remote units, which more exist in a system compared to the master unit, or a system latency, etc.

The remote unit may generate state information by analyzing the existence of, for example, the received radio frequency signal's signal power, signal to noise ratio (SNR), voltage standing wave ratio (VSWR), adjacent channel leakage ratio (ACLR), spectral emission mask (SEM), passive intermodulation (PIM), spurious signal, etc. Also, the state information may be the radio frequency signal's characteristics information itself, e.g., a power, frequency distribution characteristics, band characteristics, etc. In such a case, the master unit may determine the corresponding remote unit's radio frequency signal is abnormal not by using the state information itself but by additionally processing the received state information.

The state information generated in the state determiner 393 may be multiplexed with the digital radio frequency signal at the upper transceiver 360, which is then transmitted. The state information generated at each of the remote units, which are cascaded to each other, is multiplexed with the state information, received from lower remote units, at the upper transceiver 360 of each remote unit. If the upper transceiver 360 is implemented in a WDM-PON, one carrier frequency may be assigned to the transmission of the state information. The state information generated at each remote unit may be merged into one frame on a time axis, which is then transmitted as one packet. Also, the state information generated at each remote unit may be configured to have individual packets that each include identifiers of each remote unit, e.g., an MAC address, and multiplexed on a time axis, which is then transmitted by one WDM carrier.

The remote unit transmits the state information, which has been determined by the state determiner 393, to an upper node, e.g., the master unit, another remote unit, or a hub unit, through the upper transceiver 360. The master unit may determine, based on such state information, whether to transmit the radio frequency signal, coming from the corresponding remote unit, to a mobile communications network.

The state determiner 393 determines whether the radio frequency signal is normal, based on the radio frequency signal that has been transformed in a wavelet domain.

The following characteristics are defined: the characteristics of the coefficients of normal radio frequency signals; a function of calculating feature values from the coefficients of the radio frequency signal (a calculation function); and the feature values of normal radio frequency signals or the range thereof. The range of the feature values of the normal radio frequency signals may be empirically defined. The feature value of the received digital radio frequency signal that has been transformed into a wavelet domain is calculated through the calculation function, and is compared with the stored feature values of the normal range so that whether the digital radio frequency signal is normal may be determined. In another example, the following characteristics are defined: the characteristics of the coefficients of abnormal radio frequency signals; a function of calculating feature values from the coefficients of the radio frequency signal (a calculation function); and the feature values of abnormal radio frequency signals or the range thereof. The range of the feature values of the normal radio frequency signals may be empirically defined. The feature value of the received digital radio frequency signal that has been transformed into a wavelet domain is calculated through the calculation function, and is compared with the stored feature values so that whether the digital radio frequency signal is normal may be determined.

The remote unit may determine whether the corresponding digital radio frequency signal is normal by analyzing the existence of, for example, the digital radio frequency signal's signal power, signal to noise ratio (SNR), voltage standing wave ratio (VSWR), adjacent channel leakage ratio (ACLR), spectral emission mask (SEM), passive intermodulation (PIM), spurious signal, etc. The signal power, SNR, VSWR, ACLR, etc. may be the calculation function.

As illustrated in FIG. 4, the state determiner 393 has been described as a part of the remote unit 300, but may be implemented as an individual device or a computer system outside the remote unit 300.

The RF signal processor 311 and the inverse-RF signal processor 371 may be implemented as one RF component. The wavelet transformer 313 and the inverse-wavelet transformer 373 may be implemented by a microprocessor, a digital signal processor, a series of program modules that are accordingly executed, a gate array, or an application specific integrated circuit (ASIC). Many functions of the state determiner 393 may be implemented by the microprocessor, the digital signal processor, and the series of program modules that are accordingly executed, which are the same as described above. Such a design method of a digital system may be variously selected by those skilled in the art through the present technology.

Figure 5:
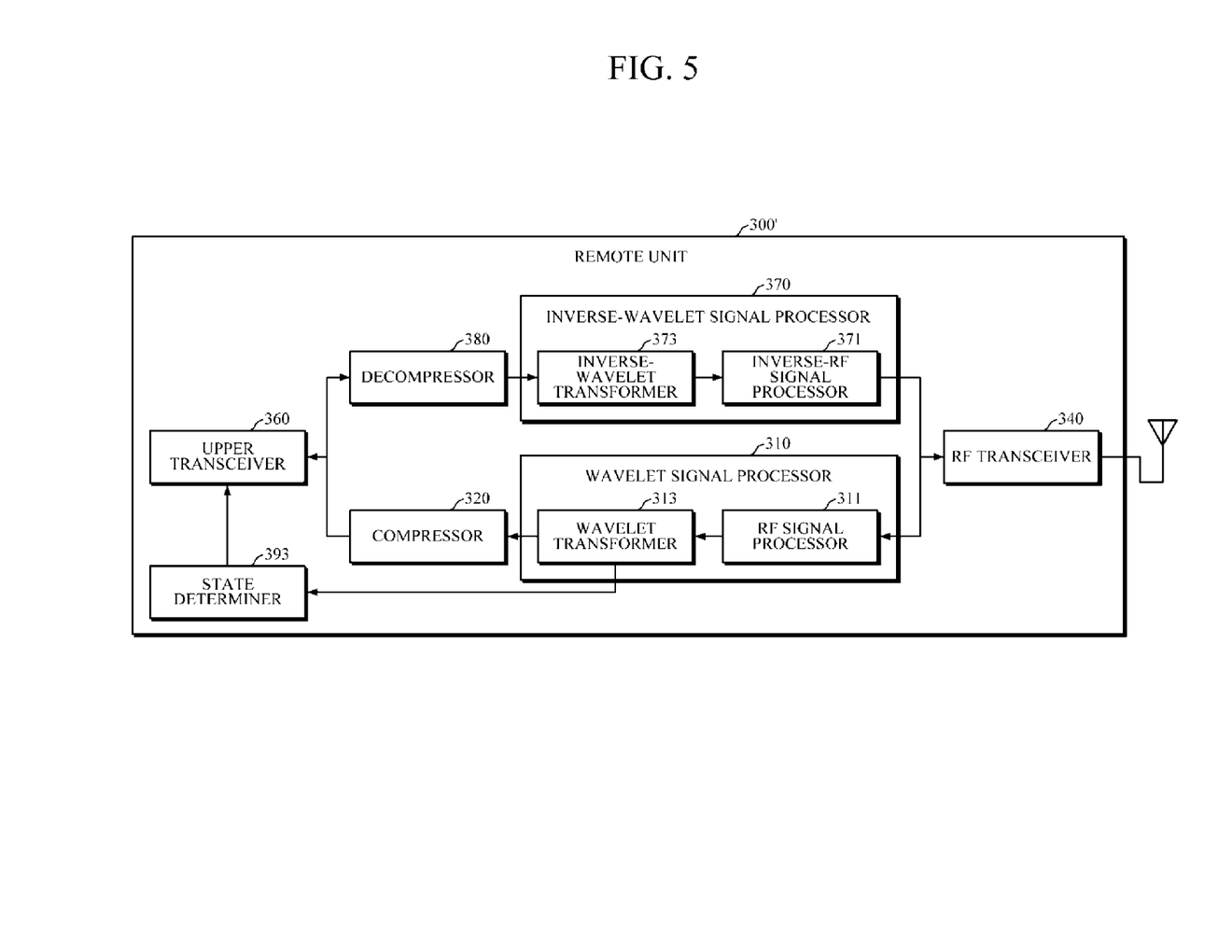
FIG. 5 is a diagram illustrating the configuration of a remote unit according to another exemplary embodiment.

FIG. 5 is a diagram illustrating the configuration of a remote unit according to another exemplary embodiment. As illustrated in FIG. 5, a remote unit 300' further includes a compressor 320 and a decompressor 380, compared to the exemplary embodiment in FIG. 4, which is the difference therebetween. On a downlink path, the decompressor 380 decompresses a digital radio frequency signal in a wavelet domain, which has been received, between a transceiver 360 and an inverse-wavelet signal processor 370. On an uplink path, the compressor 320 compresses a digital radio frequency signal, which has been transformed to a wavelet domain, between a wavelet signal processor 310 and a transceiver 360. As described before, a compression algorithm is required to be selected linearly with respect to an addition operation.

As illustrated in FIG. 5, a state determiner 393 is a radio frequency signal that remote units have transmitted and determines whether the radio frequency signal is normal, based on the signal that is before the compression. However, exemplary embodiments are not limited thereto; and the remote unit may not include a state determiner 393, but may transmit, to an upper layer, the wavelet coefficient that has been transformed in a wavelet domain, and let a device on the upper layer, such as the master unit, determine the state. Such a difference in a system configuration may be selected according to the determination of a design variable in accordance with a cost of the remote units, which more exist in a system compared to the master unit, or a system latency, etc. Also, in FIG. 5, similar to the above-mentioned exemplary embodiments, the state determiner 393 determines whether the radio frequency signal is normal, based on the radio frequency signal that has been transformed in a wavelet domain.

Figure 6:
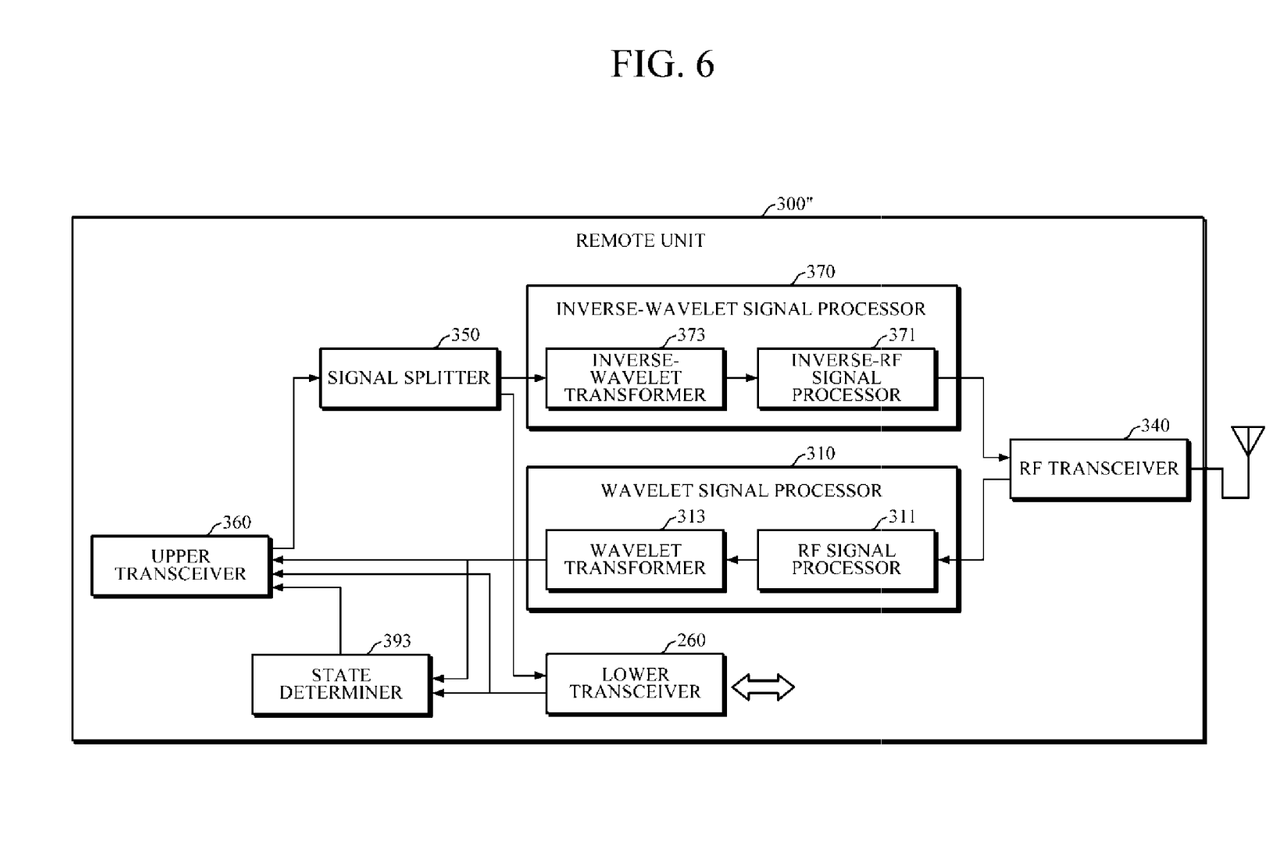
FIG. 6 is a diagram illustrating the configuration of a remote unit according to another exemplary embodiment.

FIG. 6 is a diagram illustrating the configuration of a remote unit according to another exemplary embodiment. As illustrated in FIG. 6, a distributed antenna system 300" further includes a lower transceiver 260 and a signal splitter 350.

The lower transceiver 260 outputs a digital radio frequency signal in a wavelet domain, which is received from a lower node, to an upper transceiver 360, and a digital radio frequency signal in a wavelet domain, which is received from an upper node, to a lower node. Remote units may be cascaded the same as illustrated in FIG. 1.

The signal splitter 350 splits the digital radio frequency signal in a wavelet domain, received from the upper transceiver 360, into an inverse-wavelet signal processor 370 and the lower transceiver 260.

The upper transceiver 360 multiplexes the digital radio frequency signals in a wavelet domain, each received from the lower transceiver 260 and the wavelet signal processor 310, which are then transmitted to an upper node. Here, multiplexing indicates that the radio frequency signal is not added at a level of an RF signal but transmitted in a form that is split into an individual RF signal. For example, the upper transceiver 260 employs a passive optical network (PON) using a wavelength division multiplexing (WDM) modulation, the digital radio frequency signals from the wavelet signal processor 310 and the lower transceiver 260 are, respectively, modulated to carrier frequencies that are different from each other, which is then each transmitted to an upper node. The upper node, e.g., a master node, receives the signal, which has been acquired after multiplexing the digital radio frequency signal, from a plurality of lower nodes through one port. The master unit may multiplex the received digital radio frequency signals, coming from the remote units, differently according to state information, i.e., whether the signal is normal, and transmit the multiplexed signal to a wireless communications network. For example, if it has been determined that the signal is abnormal, the master unit may transmit the normal signal to the upper node except the abnormal signal. In addition, if it has been determined that the signal is normal, the signal may be attenuated or amplified according to the strength of the signal, which may be then multiplexed.

The remote unit may further include a state determiner 393 that determines whether the radio frequency signal, received from an antenna, is normal. The remote unit transmits the state information, which has been determined at the state determiner 393, to an upper node, e.g., a master unit, another remote unit, or a hub unit, through the upper transceiver 360. The master unit may determine, based on such state information, whether to transmit the radio frequency signal, coming from the corresponding remote unit, to a mobile communications network.

In FIG. 6, similar to the above-mentioned exemplary embodiments, the state determiner 393 may determine whether the radio frequency signal is normal, based on the radio frequency signal that has been transformed in a wavelet domain.

However, exemplary embodiments are not limited thereto; and the remote unit may not include a state determiner, but may multiplex only the wavelet coefficient, transformed in a wavelet domain, for each signal, which is then transmitted to an upper layer, and let a device on the upper layer, such as the master unit, determine the state. Such a difference in a system configuration may be selected according to the determination of a design variable in accordance with a cost of the remote units, which more exist in a system compared to the master unit, or a system latency, etc. For example, a remote unit existing at the end of a system may not determine the state but transmits the wavelet coefficient of itself to an uplink, and a remote unit relaying signals may generate state information and multiplex a plurality of digital radio frequency signals according to the state information.

Figure 7:
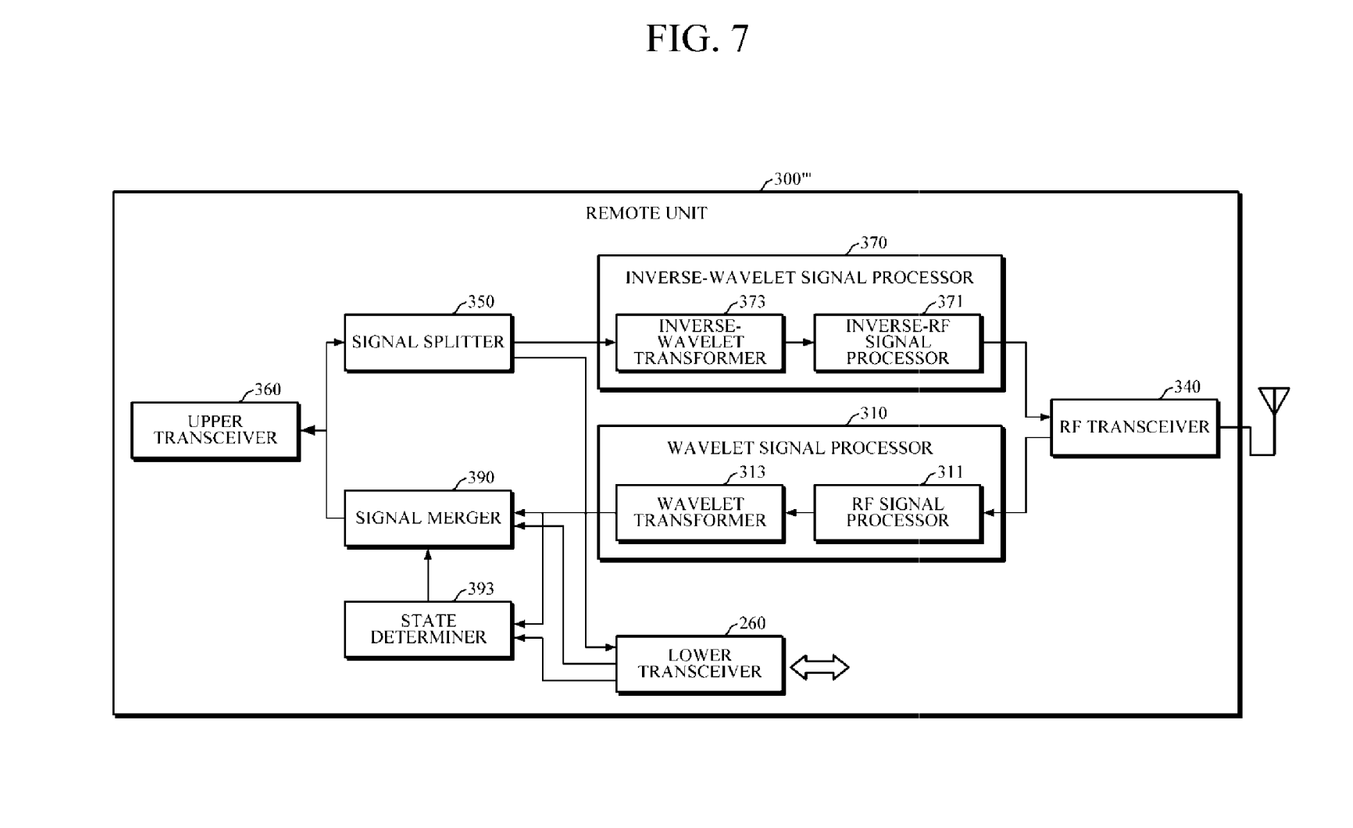
FIG. 7 is a diagram illustrating the configuration of a remote unit according to still another exemplary embodiment.

FIG. 7 is a diagram illustrating the configuration of a remote unit according to still another exemplary embodiment. As illustrated in FIG. 7, a remote unit 300''' further includes a lower transceiver 260, a signal splitter 350, and a signal merger 390.

The lower transceiver 260 transmits or receives, to or from a lower node, a digital radio frequency signal in a wavelet domain. The remote units may be cascaded through the lower transceiver 260, as illustrated in FIG. 1. A signal splitter 350 splits the digital radio frequency signal in a wavelet domain, received from an upper transceiver 360, into an inverse-wavelet signal processor 370 and the lower transceiver 260.

The signal merger 390 merges digital radio frequency signals in a wavelet domain, output from a wavelet signal processor 310 and the lower transceiver 260, which is then output to the upper transceiver 360. For example, the merge of the digital radio frequency signals may be performed through the addition between corresponding coefficients in a wavelet domain.

The remote unit may further include a state determiner 393 that determines whether the radio frequency signal is normal, which has been received from an antenna. The remote unit transmits the state information, which has been determined by the state determiner 393, to an upper node, e.g., a master unit, another remote unit, or a hub unit, through the upper transceiver 360. The master unit may determine, based on such state information, whether to transmit the radio frequency signal, coming from the corresponding remote unit, to a mobile communications network.

Similar to the above-mentioned exemplary embodiments, the state determiner 393 determines whether the radio frequency signal is normal, based on the radio frequency signal that has been transformed in a wavelet domain.

However, exemplary embodiments are not limited thereto; and the remote unit may not include a state determiner 393, but may transmit, to an upper layer, the wavelet coefficient that has been transformed in a wavelet domain, and let a device on the upper layer, such as the master unit, determine the state. Such a difference in a system configuration may be selected according to the determination of a design variable in accordance with a cost of the remote units, which more exist in a system compared to the master unit, or a system latency, etc. For example, a remote unit existing at the end of a system may not determine the state but transmits the wavelet coefficient of itself to an uplink, and a remote unit relaying signals may generate state information and merge a plurality of digital radio frequency signals according to the state information.

Figure 8:
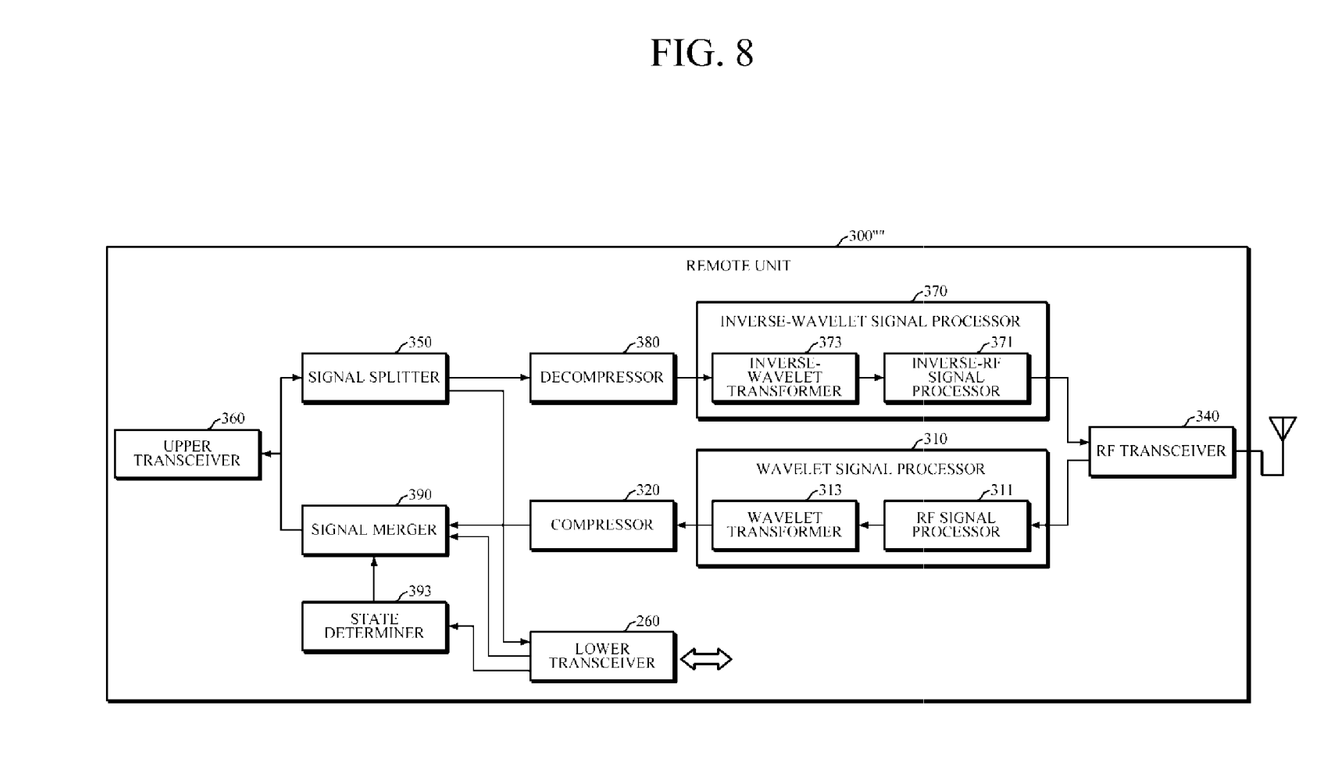
FIG. 8 is a diagram illustrating the configuration of a remote unit according to yet another exemplary embodiment.

FIG. 8 is a diagram illustrating the configuration of a remote unit according to yet another exemplary embodiment. As illustrated in FIG. 8, a remote unit according to another exemplary embodiment further includes a compressor 320 and a decompressor 380, compared to the exemplary embodiment in FIG. 7, which is the difference therebetween. On a downlink path, the decompressor 380 decompresses the digital radio frequency signal in a wavelet domain, which has been merged, between a signal splitter 350 and a wavelet signal processor 310. On an uplink path, the compressor 320 compresses the digital radio frequency signal, which has been transformed to a wavelet domain, between the wavelet signal processor 310 and a signal merger 390.

A distributed antenna system, described herein, may improve transmission efficiency between node units that are included therein. In addition, the distributed antenna system may ease an analysis of the individual characteristics of a digital radio frequency signal in digital remote units, which results in an improvement of stability in operating the distributed antenna system. Moreover, a signal latency may occur due to a latency that has been already generated at optical fibers, but by using a wavelet transform that makes less calculation amount and real-time process possible, the distributed antenna system may determine whether a terminal signal or a base station signal is normal through an economical transform making a small amount of calculations without an excessive increase in latency.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A distributed antenna system, comprising:
a master unit interfaced with a wireless communications network and perform a bidirectional simultaneous digital radio frequency distribution of a wireless signal; and
a plurality of remote units coupled to the master unit and each perform a wireless transmission or reception of a split radio frequency signal to or from terminals located within a coverage,
wherein the master unit and the plurality of remote units transmit or receive digital radio frequency signals in a wavelet transform domain and wherein the master unit determines whether the digital radio frequency signal, transmitted by each of the remote units, is normal or abnormal based on the digital radio frequency signals transformed to the wavelet domain.

2. The distributed antenna system of claim 1, wherein the master unit merges the digital radio frequency signals according to whether the digital radio frequency signal transmitted by each of the remote units is normal.

3. The distributed antenna system of claim 2, wherein the master unit calculates and merges a weighted sum of each radio frequency signal, of which a weight changes according to whether the digital radio frequency signal is normal.

4. The distributed antenna system of claim 2, wherein the master unit merges normal and abnormal digital radio frequency signals into respective groups.

5. The distributed antenna system of claim 1, wherein the master unit and the plurality of remote units compress the digital radio frequency signal, on which a wavelet-transform has been performed, and transmit or receive the compressed digital radio frequency signal.

6. The distributed antenna system of claim 1, wherein the distributed antenna system is coupled to the master unit on one side thereof and to another plurality of remote units on the other side thereof, and
further comprises a hub unit relaying digital radio frequency signals in a wavelet transform domain, which are transmitted and received between the plurality of remote units and the master unit.

7. A master unit in a distributed antenna system, the master unit comprising:
a wavelet signal processor transforming, to a wavelet domain, a radio frequency signal coming from a mobile communications network;
a signal splitter splitting the digital radio frequency signal, transformed to a wavelet domain, into a plurality of digital radio frequency signals; and
a signal merger merging digital radio frequency signals in a wavelet domain, which are received from a plurality of remote units;
an inverse-wavelet signal processor performing an inverse-wavelet transform on the merged digital radio frequency signal, which is then transformed to a radio frequency signal and output to a mobile communications network; and
a merge controller determining whether the digital radio frequency signal, transmitted by each of the remote units, is normal or abnormal based on the digital radio frequency signal transformed to a wavelet domain, and control the merge in the signal merger.

8. The master unit of claim 7, wherein the merge controller determines whether the digital radio frequency signal, transmitted by each of the remote units, is normal, and calculates and merges a weighted sum of each digital radio frequency signal, of which a weight changes according to whether a corresponding radio frequency signal is normal.

9. The master unit of claim 7, wherein the merge controller determines whether the digital radio frequency signal, transmitted by each of the remote units, is normal, and merges normal and abnormal digital radio frequency signals into respective groups.

10. The master unit of claim 7, further comprising:
a compressor compressing a digital radio frequency signal, transformed to a wavelet domain, between the wavelet signal processor and the signal splitter; and
a decompressor decompressing a merged digital radio frequency signal in a wavelet domain between the signal merger and the inverse-wavelet signal processor.

11. A remote unit in a distributed antenna system, the remote unit comprising:
an upper transceiver transmitting or receiving digital radio frequency signals in a wavelet domain to or from an upper node;
an inverse-wavelet signal processor performing an inverse-wavelet transform on the digital radio frequency signals, output from the upper transceiver, which is then transformed to a split radio frequency signal and output to an antenna;
a wavelet signal processor transforming the radio frequency signal, received from the antenna, to a wavelet domain, which is then output to the upper transceiver
a lower transceiver transmitting or receiving the digital radio frequency signal to or from a lower node;
a signal splitter splitting the digital radio frequency signal, received from the upper transceiver, to an inverse-wavelet signal processor and a lower transceiver;
a signal merger merging the digital radio frequency signals, which are output from the wavelet signal processor and output from the lower transceiver, and output the merged digital radio frequency signal to the upper transceiver; and
a state determiner determining whether the digital radio frequency signal, transmitted by each of the remote units, is normal based on the digital radio frequency signal transformed to the wavelet domain.

12. The remote unit of claim 11, further comprising:
a decompressor decompressing a merged digital radio frequency signal in a wavelet domain between the signal splitter and the inverse-wavelet signal processor; and
a compressor compressing a digital radio frequency signal, transformed to a wavelet domain, between the wavelet signal processor and the signal merger.

13. The remote unit of claim 11, further comprising:
a decompressor receiving and decompressing the digital radio frequency signal, transformed to a wavelet domain, and outputting the decompressed digital radio frequency signal to the inverse-wavelet signal processor; and
a compressor compressing a digital radio frequency signal transformed to a wavelet domain, which is output from the wavelet signal processor.

* * * * *